May 7, 1935. A. H. HANNON Re. 19,560

ELECTROPROCESSING MACHINE

Original Filed March 16, 1931 3 Sheets-Sheet 1

INVENTOR
ALBERT H. HANNON.
BY
ATTORNEYS.

May 7, 1935. A. H. HANNON Re. 19,560

ELECTROPROCESSING MACHINE

Original Filed March 16, 1931 3 Sheets-Sheet 2

INVENTOR
ALBERT H. HANNON.
BY
ATTORNEYS.

May 7, 1935. A. H. HANNON Re. 19,560

ELECTROPROCESSING MACHINE

Original Filed March 16, 1931 3 Sheets-Sheet 3

INVENTOR
ALBERT H. HANNON.
BY
ATTORNEYS

Reissued May 7, 1935 Re. 19,560

UNITED STATES PATENT OFFICE 19,560

ELECTROPROCESSING MACHINE

Albert H. Hannon, Springfield, Ohio

Original No. 1,895,622, dated January 31, 1933, Serial No. 523,007, March 16, 1931. Application for reissue March 24, 1933, Serial No. 662,522

14 Claims. (Cl. 204—5)

This invention relates to improvements in electroprocessing machines, such as for cleaning, plating and the like, and the main objects of the invention are to provide a fully automatic machine for processing or plating relatively small pieces of work so that such work may be turned out in large quantities at a low cost.

Heretofore, since it would require a great deal of labor to rack small pieces, such as screw-machine products, stampings, bolts and nuts, drums or plating barrels have been provided, into which the pieces are dumped. The barrel machines accomplished only the one plating operation, and it was necessary to employ cleaning machines, tumbling barrels for the acid solutions, as well as rinsing tanks to prepare the work for the plating.

In this invention, each individual barrel is moved continuously from the loading station, through the various solutions, baths and driers, back to the starting position. Only one handling of the pieces is required, and an enormous output with very little labor is produced.

An endless conveyor is provided which travels in a horizontal plane, and the barrels or drums are detachably mounted over the outer ends of rods or shafts which are pivoted at the inner ends to the conveyor and project laterally therefrom into the tanks, which are arranged about the conveyor, the rods being raised to lift the drums over the ends of the tanks, and means being provided for rotating the drums while the drums are in the tanks.

All moving electrical contacts are out of and away from the solution, and communication of the current through rotative bearings which wear and become loose, is avoided. Only one motor and driving mechanism is required for all of the barrels, reducing the initial and upkeep expense over the provision of a drive for each barrel; and the machine occupies a minimum amount of floor space because no waste space is needed for moving around the tanks.

As soon as the metal is plated out of the solution the resistance increases and the pieces become coated with bubbles of hydrogen. In the single-barrel machines, various methods, such as pumping in new solution, have been employed, but by moving the barrels along in the tanks, the depletion of the solution around the pieces and hydronization, that is to say collecting of bubbles of hydrogen gas on the surface of the work, are effectually overcome. This movement also makes the plating very uniform and evens up the action on the different batches, so that there is no liability of large quantities of good work being rejected because small quantities of the work are not up to the requirements of the inspection.

In the prior methods where the barrel revolves in one position, parts of the work may be presented to a group of anodes which have become shortened or insulated in some manner, or only the stub of an anode may be left hanging on a hook unperceived by the operator. In this invention, all of the pieces receive the same anodic exposure.

Also in this machine the pieces can be electrocleaned in the alkaline solution, and electropickled in the acid solution without undue expense for additional equipment.

Formerly, in barrel plating, a batch of work is placed in a steel drum containing a heated alkaline solution for removing the grease and fats. This drum is revolved to facilitate the action. After a length of time, the work is removed, washed, and then placed in another tumbling barrel having an acid solution. After tumbling, the work is washed a second time before it is placed in the plating barrel. The expense of providing for electrolytic action in the tumbling barrels is prohibitive, but in the present invention both tumbling and electrolytic actions are easily furnished. This, in addition to the increased agitation and circulation obtained by moving the barrel along as it is revolved, greatly accelerated the cleaning and pickling actions.

Other objects and advantages will become apparent in the following description, with reference to the accompanying drawings, in which an illustrative embodiment of my invention is shown.

Figure 1:
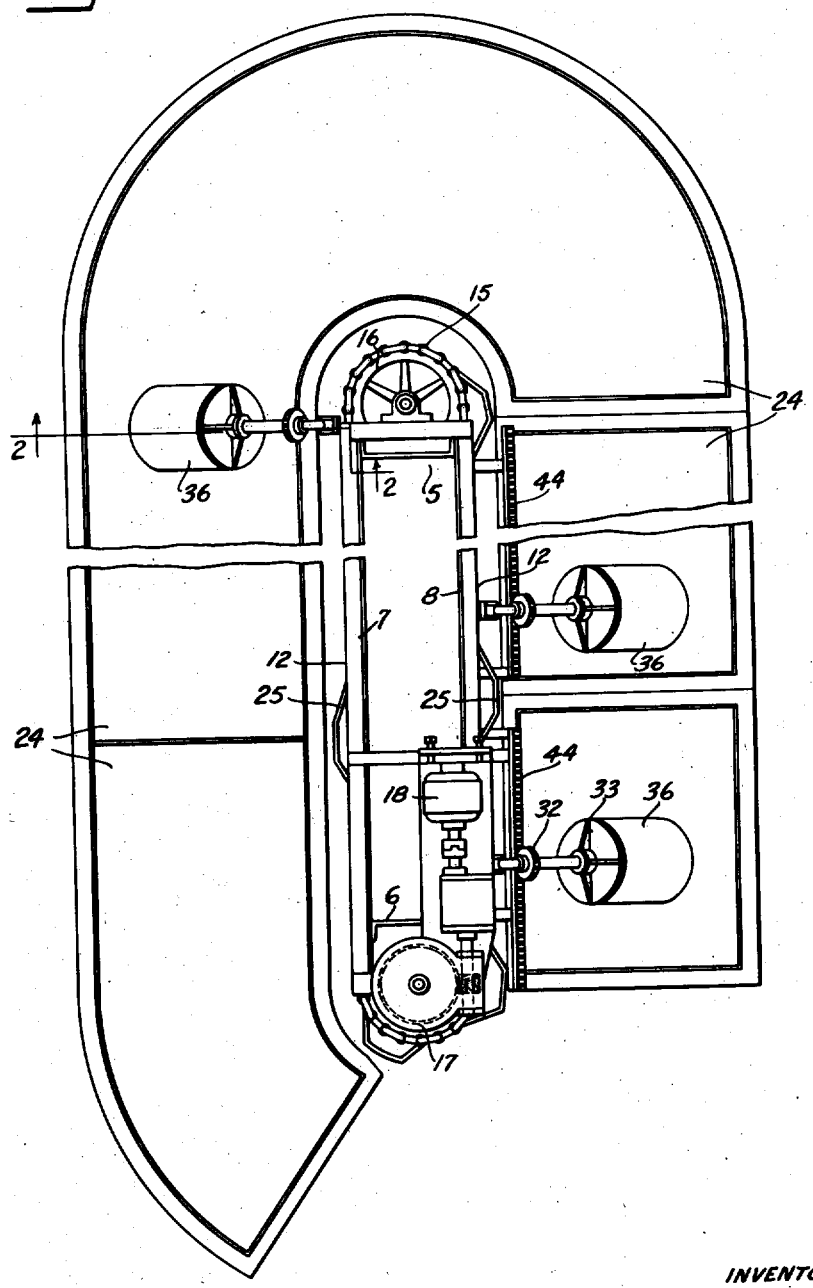
Fig. 1 is a plan view of the machine, with sections broken out.

I provide a frame comprising the spaced supporting standards 5 and 6, to the upper portions of which, at each side, are secured the channel-section longitudinal members 7 and 8, the flanges 9 and 10 of which project outwardly. To the upper flange 9, of each channel, is secured an angle section member 12, with the outer flange 13 projecting downwardly to form an inverted channel 14 in which the conveyor chain 15 is laterally guided at the sides of the frame.

The conveyor chain 15 is supported on sprocket wheels 16 and 17, one rotatably mounted on each end of the frame, the wheel 17 being driven in rotation by the motor 18. At intervals along the lower side of the chain, plates 181 are secured for attaching the arm-support brackets 19. Each bracket is provided with an antifriction roller 20 which rolls on the projecting flange of the angle sectioned support rail 21, secured to the mid-portion of the frame member 7 or 8, so that the bracket is firmly supported to move in a horizontal plane.

Pivoted to each bracket 19, and insulated therefrom, is a bell crank comprising the angularly-related, depending arms 211 and 22, the inner arm 22 being provided with a roller 23 which operates on the adjacent surface of the channel to support the outer arm 211 in the vertical plane. At each side of the frame and around the ends thereof are positioned the solution tanks 24, some being filled with hot or cold water for rinsing or washing, and others with cleaning, pickling, or plating solutions, as may be desired. Adjacent the ends of the tanks, suitable cams 25 are bolted to the frame, which engage the rollers 23 so that, as each bracket is carried along by the conveyor from one tank to the next, the corresponding arm 211 is lifted as it passes over the ends of the tanks.

In the end of the arm 211 is fixedly secured a copper rod or shaft 26 which projects downwardly into the tanks when the arm is in its lowered position; and insulatingly and fixedly mounted on the medial portion of the rod is a bronze sleeve 27. The sleeve 27 is slotted at the upper end and clamped to the rod by means of the split collar 28, which is provided with an annular recess 29 for engaging the flange 30 formed on the upper end of the steel sleeve 31 and thus rotatably supporting the sleeve 31 on the outer side of the sleeve 27.

A bronze spur gear 32 is keyed or otherwise fixedly mounted on the upper end of the outer sleeve 31, and cover 33 is clamped to the lower end of the same by the divided clamp 34, the cover and the clamp being insulated by the layer of non-conductive material 35. The perforated drum or barrel 36, for holding the pieces of work, is removably attached to the cover 33, as by clamps 37, hinged to the cover, the position of the barrel being such that the lower end of the rod 26 extends down toward the bottom of the barrel. The sides of the rod 26 are covered with an insulating coating 38, and a cross rod 39 may be provided near the end for increasing the area of surface exposed for the flow of the current into or out of the solution. On the lower end of the bronze sleeve 27, which is spaced from the lower exposed end of the rod 26, is mounted a disc 40 of insoluble material which is used as an electrode opposed to the electrode 39.

Figure 2:
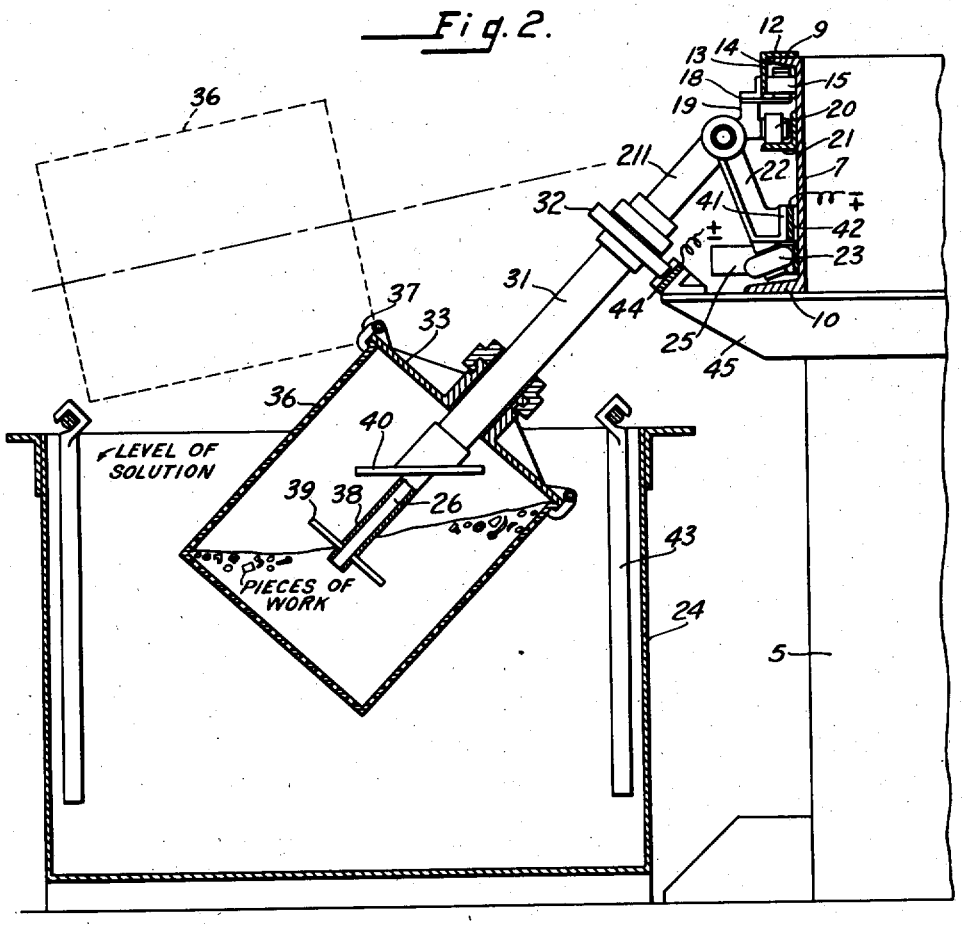
Fig. 2 is a partial cross section, taken substantially on the line 2—2 of Fig. 1.
Figure 3:
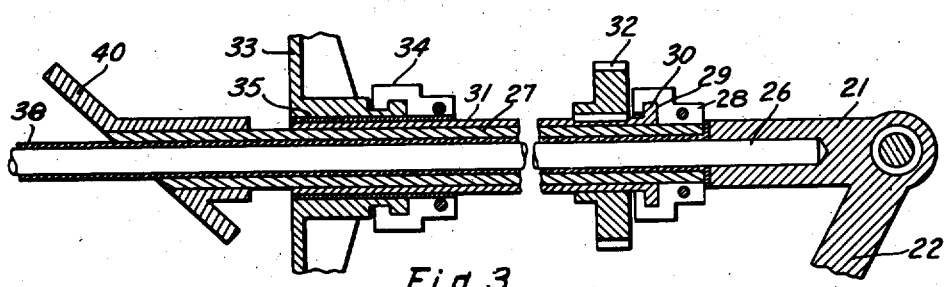
Fig. 3 is an enlarged cross section of the drum-supporting arm, shown in Fig. 2.
Figure 4:
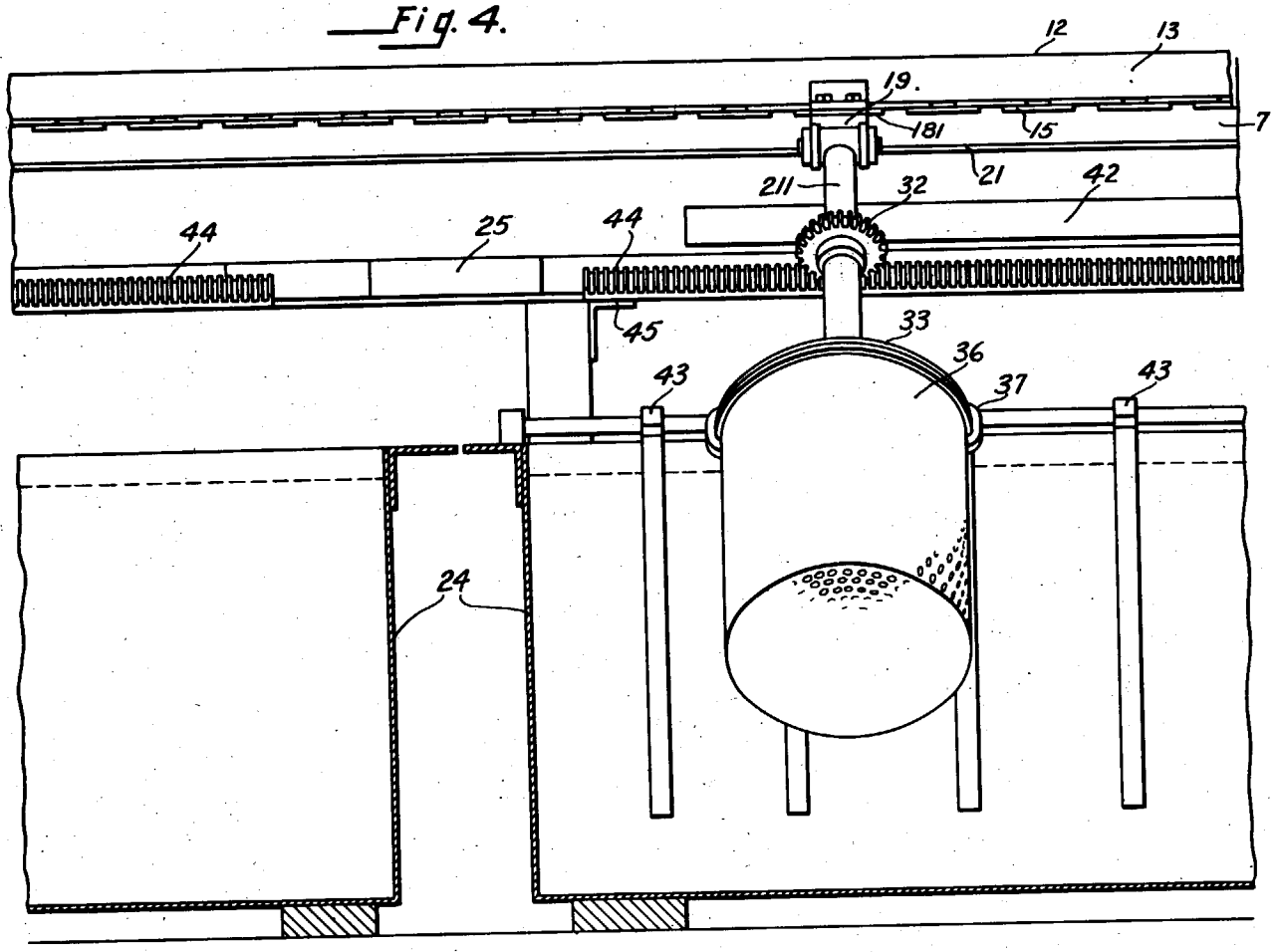
Fig. 4 is a fragmentary side elevation of the parts shown in Fig. 2.

Integrally formed on the arm 22, is a contact shoe 41 which contacts with a bus bar 42 mounted on the side of the frame member 7, or 8. Thus the rod projects down into the midst of the pieces of work in the barrel, and provides, in the more usual kinds of plating, the negative contact. The rod may be in the center of the drum, or the drum may be mounted eccentrically to increase the mixing. Where the copper rod provides the negative contact, the positive connection is made through the anode bars 43 which are hung on the sides of the tank containing the plating solution, the bars 43 being soluble and providing the metal for the plating. With such an arrangement, the current would flow from the anodes to the negative contact, or cathode through the solution on the perforations in the barrel. However, the plate 40 may be used to provide an inner and ancillary positive connection which gathers metal locally out of the solution and transfers the metal directly to the work. The connection to the plate 40 is made from a bronze rack 44, which meshes with the gear 32 and thus has efficient electric contact therewith. The rack is insulatingly mounted on arms 45, secured to the frame, along the tanks with which the current is to be used. The connection to the bus bar 42 may be minus or plus and the connection to the rack plus or minus, as indicated in Fig. 2, depending on the direction desired for the flow of the current.

The integrally formed arms, with the contact shoe 41, may be of brass to provide a good connection to the copper rod. The gears, rack, and sleeve 27, may be either brass, bronze or other highly conductive material, and all of the moving contacts are out of and remote from the solution. The drum or barrel may be of insulating material, such as fiber, bakelite, or hard rubber; or perforated steel sheets, or wire-mesh rubber covered by an electrolytic process may be used. In some cases a rubber-covered, aluminum wire basket is employed on account of the light weight, but in other instances the drum may be used as a conductor.

In operation, the pieces, sometimes as many as two or three hundred in a lot, are loaded into the drum at the starting point, and the drum attached in position to the cover. The drum is then automatically lifted over the ends of the tank and lowered and rotated as it is carried through the solutions, thus tumbling the pieces while treating them. Where current is used, the connections are made through the bus bars and rack provided at such locations. The drums make the circuit of the tanks and are finally brought back to the starting place, where they are removed and unloaded by the same operator, so that all the operations are performed with the one loading and the plating fully completed.

While I have illustrated and described but one illustrative embodiment of my invention, it is to be understood that many omissions and alterations may be had without departing from the spirit of the invention, as defined in the following claims.

I claim:

1. In an electroprocessing machine: a solution tank, a support bracket, means for moving the bracket horizontally along the tank, a shaft pivotally attached to the bracket to project over and into the tank, a perforated work receptacle insulatingly and rotatably mounted on the end of the shaft, means for supporting and for swinging the arm upwardly as the bracket moves past the end of the tank, means for rotating the receptacle on the shaft, and means for causing a flow of current between the solution and said shaft.

2. In an electroprocessing machine, a row of solution tanks, a frame extending along one side of the tanks, a bracket slidably supported on the frame for horizontal movement, a rod projecting over the tanks pivoted to the bracket and insulated therefrom, a perforated work holding barrel rotatably mounted over the outer end of the rod and insulated therefrom, means rotating the barrel, means for swinging the arm on the bracket to raise the barrel over the ends of the tanks, and means for causing a flow of electrical current between the solutions in the tanks and the rod.

3. In an electroprocessing machine, a solution tank, a frame extending along one side of the tank, a bracket slidably supported on the frame for horizontal movement, means for moving the bracket along the frame, an insulated rod pivoted at one end to the bracket and extending over the tank, a perforated cylindrical receptacle mounted on the outer end of the rod, a cam mounted on the frame for raising and lowering the rod at the ends of the tank, and a bus bar mounted on the frame for contacting with the rod in lowered position and making an electrical connection thereto.

4. In an electroprocessing machine, the combination with a conveyor of an insulated rod pivotably mounted on the conveyor and projecting laterally therefrom, a perforated receptacle for holding the work rotatably mounted on the outer end of the rod, a cam for raising and lowering the rod, a stationary bus bar contacting with the rod in lowered position and means for rotating the receptacle.

5. In a machine of the character described, the combination with a solution tank of an insulated rod, means for dipping the rod into the tank and moving the rod along, an insulated sleeve mounted on the medial portion of the rod, and a perforated drum over the end of the rod and insulatingly mounted near the end of the sleeve, the sleeve and the rod being connected to the opposite polarities of an electrical source.

6. In a machine of the character described, the combination with a solution tank of a shaft, a sleeve insulatingly and rotatably mounted on the mid portion of the shaft, a perforated drum over the end of the shaft and insulatingly mounted on the sleeve, means for moving the shaft along with the drum in the tank, means for raising the shaft to lift the drum over the ends of the tank, and means for rotating the sleeve.

7. In an electroprocessing machine, the combination with a conveyor of an insulated rod pivotably mounted on the conveyor and projecting laterally therefrom, an insulated sleeve rotatably mounted on the medial portion of the rod and having a spur gear fixed on the upper end thereof, an insulated and perforated work receptacle over the outer end of the rod, the receptacle being fixedly mounted on the outer end of the sleeve, a cam for raising and lowering the rod, an insulated bus bar for contacting with the rod, and an insulated rack for meshing with the said gear when the rod is in lowered position, the bus bar and the rack being connected to opposite polarities of an electrical source.

8. In an electroprocessing machine, a solution tank, an inclined insulated shaft, a hollow tumbling receptacle mounted on the end of the shaft, means for supporting and moving the inclined shaft along the tank, means for raising and lowering the shaft to dip the receptacle into the tank and to lift the receptacle over the ends of the tank, and means for causing electrical energy to flow between the solution in the tank and the shaft.

9. In an electroprocessing machine, a solution tank, an inclined shaft, a hollow tumbling receptacle for holding loose pieces of work for plating, the receptacle being removably mounted on the end of the shaft, means for supporting and moving the inclined shaft along the tank, means for raising and lowering the shaft to lift the receptacle over the ends of the tank and to dip the receptacle into the tank, and means for causing a flow of electrical energy between the solution and the pieces of work.

10. In an electroprocessing machine, a solution tank, an inclined shaft, means for supporting the inclined shaft and moving the same along the tank, a hollow tumbling receptacle removably mounted on the end of the shaft for holding loose pieces for being plated, and means for lowering and raising the shaft as it is moved along to dip the receptacle into the solution in the tank and to lift the same over the ends of the tank.

11. In an electroprocessing machine, a solution tank, an inclined shaft, means for supporting the inclined shaft and moving the same along the tank, a tumbling receptacle for holding loose pieces for being plated, the receptacle being removably mounted on the shaft, means for lowering and raising the shaft as it is moved along to dip the receptacle into the solution in the tank and to lift the receptacle over the ends of the tank, and means for rotating the receptacle.

12. In an electroprocessing machine, a solution tank, a supporting member, means for moving the supporting member along the tank, an arm attached to the supporting member to project over and into the tank at an angle to the horizontal, a work-support rotatably mounted on the arm and so supported to cause the work pieces to assume different vertical and horizontal positions in the tank, means for swinging the arm upwardly as the supporting member goes past the end of the tank, means for rotating the work-support on the arm, and means for causing a flow of current between the solution and said shaft.

13. In an electroprocessing machine, a solution tank, a supporting member, means for moving the supporting member along the tank, an arm attached to the supporting member to project over and into the tank at an angle to the horizontal, a work-support insulatingly and rotatably mounted on the arm and so arranged as to cause the work pieces on the work support to assume different vertical and horizontal positions in the tank, means for swinging the arm upwardly as the supporting member moves past the end of the tank without rotation, and means for causing a flow of current between the solution and said arm.

14. In an electroprocessing machine, a plurality of solution tanks, a frame extending along the tanks, a supporting member slidably arranged on the frame for horizontal movement, an arm projecting over the tanks secured to the supporting member and insulated therefrom, means for rotating the work-support, means for swinging the arm relative to the supporting member to raise the work-support over the ends of the tanks, and means for causing a flow of electrical current between the solutions in the tanks and the arm.

ALBERT H. HANNON.